UNITED STATES PATENT OFFICE.

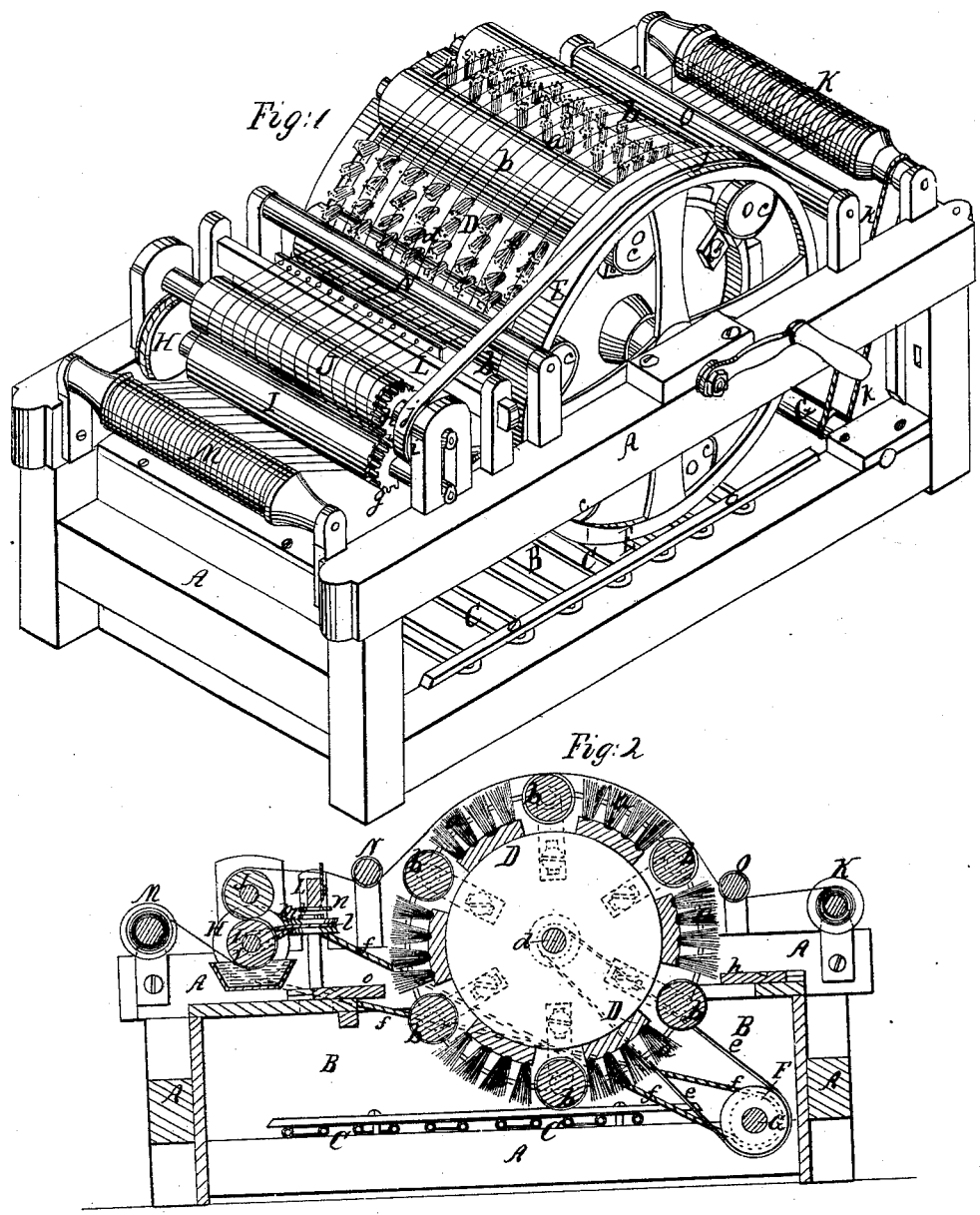

HORACE DANIELS, OF PAWTUCKET, RHODE ISLAND.

IMPROVEMENT IN MACHINERY FOR DRESSING SEWING-THREAD.

Specification forming part of Letters Patent No. 35,084, dated April 29, 1862.

*To all whom it may concern:*

Be it known that I, HORACE DANIELS, of Pawtucket, in the county of Providence and State of Rhode Island, have invented certain new and useful Improvements in Machines for Dressing Sewing-Thread; and I do hereby declare the following to be a full, clear, and exact description of the same, reference being had to the accompanying drawings, making a part of this specification, in which—

Figure 1 represents a perspective view of the machine. Fig. 2 represents a longitudinal vertical section through the same.

Similar letters of reference, where they occur in the separate figures, denote like parts of the machine in both of the drawings.

I am aware that several machines have been invented and patented for dressing sewing-thread, and that a brush-cylinder for this purpose is not new. I am also aware that in the dressing of threads artificial heat has been used for drying the size.

My invention consists in combining with a revolving brush-cylinder a series of lifting or carrying rolls which turn with the brush-cylinder, but at the same time may turn on their own axes or journals, for the purpose of holding up and carrying or supporting the thread while the brushes are operating upon it; and it further consists in so arranging the brush-cylinder with regard to an inclosed hot-air chamber as that it shall revolve partially in said chamber and partially exposed to the surrounding air.

To enable others skilled in the art to make and use my invention, I will proceed to describe the same with reference to the drawings.

A represents a frame, which incloses a chamber, B, that may be heated by a coil of steam-pipes, C, or otherwise. Upon this frame is mounted in suitable bearings a brush-cylinder, D, composed of alternate bristles $a$ and rolls $b$, as seen in the drawings. The rolls $b$ are hung in bearings arranged upon the cylinder D, so that while they turn with the cylinder D they may move on their own journals, even to having a retrograde motion, if found desirable.

In the drawings I have represented the rolls as being driven by a rim, E, near the cylinder in a retrograde direction to that given to the cylinder itself, as follows: Each of the rolls $b$ has a tight pulley, $c$, upon it, which presses with sufficient force against the rim E to be driven by said rim, which is rotated, and which consequently turns said rolls in a direction contrary to that of the brush-cylinder while they revolve with the cylinder. The brush-cylinder is run at a high velocity by any first-moving power, and the other moving parts are geared to or may be driven from the brush-cylinder D.

The rim E is hung loosely on the shaft $d$ of the brush-cylinder, so that it can turn independent of said shaft or cylinder. From the shaft $d$ a belt, $e$, passes to and around a pulley, F, on a shaft, G, and from this shaft, or a pulley upon it, a twisted belt, $f$, passes to and around a pulley, H, on the end of the lower feed-roll, I, to give said feed-roll its motion. The feed-roll I has a gear-wheel, $g$, upon its end opposite to the pulley H, and this wheel $g$ gears into and turns another wheel, $h$, on the upper feed-roll, J, to give this upper roll its proper motion. The roll J, I propose to make of soapstone, and it should be heavy enough in itself, or by additional weight or pressure, to squeeze out between itself and the lower roll, I, the excess of size, which the threads take up by passing through the size-trough, which is placed underneath the roll I. From a pulley, $i$, on the shaft or journal of the upper feed-roll, J, a belt or band, $j$, passes around the rim E, giving to the rim a motion in the direction of the rotation of the brush-cylinder, but at a considerably-reduced velocity. The rolls $b$, turning with the brush-cylinder, have a high velocity in the orbit of the brush-cylinder; but the pulleys $c$ on these rolls press hard enough against the rim E, which runs at a less velocity, to govern their speed around their own axes, so much so as to make them even turn in a contrary direction to that of the main cylinder. These rolls $b$ serve to hold up and carry the threads, so that they may be polished by the brushes, and as the threads travel much slower than the perimeter of the brush-cylinder the rolls must travel at a correspondingly low speed, or else they would bend to put a strain or draft upon the threads, which it is desirable to avoid.

With some kinds of thread the friction-pulleys $c$ may be drawn away from the rim E, so that they will not be turned by a positive motion, but simply turn by the friction of the threads upon them, and in this case it may happen that the friction, tension, force, or velocity may be such that the rolls will not turn upon their journals, but merely turn with the cylinder; but that they may turn whenever it is requisite they should be hung upon journals supported in suitable boxes for that purpose. I prefer to drive the rolls on their own axes by a positive motion, but do not confine myself to this mode, for reasons above stated.

The take-up K may be driven from the shaft G by a belt or band $k$, and the traverse L may be driven from the shaft of the roll I by means of a belt, $l$, Fig. 2, and a crank-pin or wrist-pin wheel, $m$, that works in a slot in a plate, $n$, connected to the traverse L.

In the under or lower part of the frame is arranged a coil of steam-pipes, C, for drying the threads as they are carried over or past the polishing-cylinder, and the under part of the frame is boxed up, so as to form a comparatively tight hot-air chamber. (The side of this chamber is removed in the drawings, Fig. 1, so as to show the interior of the chamber.) The cylinder D, it will be perceived, revolves through this chamber, and slides $o\ p$ are arranged on the top covering of the chamber to regulate the quantity of hot air that may pass to the threads from the chamber B.

I have represented the thread as being taken from a long roll, M, and after being sized, dressed, and polished as being taken up on another roll, K. In practice the thread is taken from bobbins and wound upon bobbins or spools. This of course does not change the operation, as the thread can be let off from and taken up onto spools as readily and with the same uniformity as with the long rolls shown.

The thread to be dressed or polished is first taken from the spools, passed underneath the feed-roller I, and through the size-trough located there, thence around I and up and over the upper feed-roll, J, thence through holes in the traverse-guide L and underneath a guide-roll, N, and over the upper portion of the brush-cylinder resting upon the bearing-rolls $b$, and thence underneath a guide, O, to the take-up roll K, all of which is represented by the red lines in the drawings. Motion being now communicated to the main or brush cylinder, the thread is slowly drawn through or over the machine by the take-up roll K, with which the motions of the other parts conform, except that of the brush-cylinder, which runs at a much higher speed, sufficiently so to polish the thread as the brushes pass it in contact with it.

The roll I may be covered with cloth. The rolls $b$ may be made of wood or metal, and may be covered with cloth, felting, or rubber. Instead of the traverse bar or guide L, the main cylinder may be caused to have a traverse in its bearings, which accomplishes the same result—viz., the moving of the thread and bristles, so as not to work in one place all the time. The traverse-guide is, however, the most simple.

The coil of steam-pipes, instead of being connected with the machine, may be elsewhere in the building, and the heated air from them or from any other source be carried or driven to the hot-air chamber of the machine for the purpose of drying the size.

Having thus fully described my invention, what I claim as therein new, and desire to secure by Letters Patent, is—

1. In combination with a revolving brush-cylinder, a series of lifting or carrying rolls which turn with said cylinder, but may turn on their own axes independent of the motion of the cylinder of which they are a part, substantially as described.

2. The so arranging of the brush-cylinder with regard to a hot-air chamber, as that while it shall revolve partially in or through said air-chamber and partially in or through the surrounding air the regulating-slides $o\ p$ may govern or regulate the hot air admitted to both portions, substantially as and for the purpose described.

HORACE DANIELS.

Witnesses:
A. B. STOUGHTON,
H. W. PRICE.